United States Patent
Hart et al.

(10) Patent No.: US 8,225,001 B2
(45) Date of Patent: Jul. 17, 2012

(54) FEATURE PROPAGATION

(75) Inventors: James E. Hart, Dracut, MA (US); Adnan S. Jariwala, Pune (IN); Jaitirth V. Shirole, Pune (IN)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 12/652,800

(22) Filed: Jan. 6, 2010

(65) Prior Publication Data

US 2011/0167117 A1 Jul. 7, 2011

(51) Int. Cl.
*G06F 15/16* (2006.01)

(52) U.S. Cl. ........ 709/248; 709/205; 709/212; 709/216; 709/217; 709/220

(58) Field of Classification Search .................. 709/201, 709/206, 207, 246, 251, 248, 205, 212, 216, 709/217, 220
See application file for complete search history.

(56) References Cited

U.S. PATENT DOCUMENTS

| | | | |
|---|---|---|---|
| 6,211,874 B1 * | 4/2001 | Himmel et al. ............. | 715/781 |
| 6,272,545 B1 * | 8/2001 | Flanagin et al. ............ | 709/228 |
| 6,907,471 B2 * | 6/2005 | Dionne et al. ............. | 709/248 |
| 6,931,454 B2 * | 8/2005 | Deshpande et al. ......... | 709/248 |
| 6,959,320 B2 | 10/2005 | Shah et al. | |
| 7,096,255 B2 * | 8/2006 | Malik ....................... | 709/206 |
| 7,149,884 B2 * | 12/2006 | O'Connor et al. ............ | 713/1 |
| 7,209,895 B2 * | 4/2007 | Kundtz et al. .............. | 705/14.4 |
| 7,328,243 B2 | 2/2008 | Yeager et al. | |
| 7,568,010 B2 * | 7/2009 | Lyle et al. ................. | 709/206 |
| 7,660,831 B2 * | 2/2010 | Freedman ................. | 707/621 |
| 7,715,444 B2 * | 5/2010 | Goyal et al. ............... | 370/507 |
| 7,958,192 B2 * | 6/2011 | Harik et al. ................ | 709/204 |
| 7,987,262 B2 * | 7/2011 | Tung et al. ................. | 709/224 |
| 7,987,294 B2 * | 7/2011 | Bryce et al. ................ | 709/248 |
| 8,037,140 B2 * | 10/2011 | DelGaudio et al. .......... | 709/206 |
| 8,046,624 B2 * | 10/2011 | Williamson et al. ......... | 713/502 |
| 8,086,772 B2 * | 12/2011 | Peev et al. ................. | 710/72 |
| 8,107,503 B2 * | 1/2012 | Goyal et al. ............... | 370/507 |
| 2005/0021644 A1 * | 1/2005 | Hancock .................. | 709/206 |
| 2008/0130639 A1 | 6/2008 | Costa-Requena et al. | |
| 2010/0179991 A1 * | 7/2010 | Lorch et al. ............... | 709/206 |

FOREIGN PATENT DOCUMENTS

WO 2009076843 6/2009

* cited by examiner

*Primary Examiner* — Michael Won
(74) *Attorney, Agent, or Firm* — A. Bruce Clay

(57) ABSTRACT

Software is propagated over a social network through an instant message client. The software is propagated to a computing device in the social network over the instant message client, wherein the software is based upon a rating system within the social network.

20 Claims, 3 Drawing Sheets

FEATURE PROPAGATION

BACKGROUND

The present invention relates, in general, to software distribution, and more specifically, to the propagation of software features through trusted networks.

The use of software application extension models that feature small plug-ins or other similar incremental functions in, for example, web browsers, Eclipse, and Instant Messaging, are becoming more common. These extension models may be written by "power users" or "scripters" (i.e., personnel not in a centrally managed, traditional software development process). However, such non-traditional development techniques make the advertising and distribution of these application extension models difficult.

Mechanisms for distribution of such features may rely on a client-server model through a host site for automated updates or manual access to initiate a download. If authors of new features have to rely on the organization's infrastructure to distribute their creations, the chance of the feature quickly reaching their intended end-users is lowered. Creating and maintaining a hosting infrastructure may add to expense, as well as have at least one limitation. That is, the end-users may be unaware of when and where new features are available, and, thus, they may miss out on new functionality that is available.

BRIEF SUMMARY

According to one embodiment of the present invention, a computer implemented method propagates software over a social network through an instant message client. The software is propagated to a computing device in the social network over the instant message client, wherein the software is based upon a rating system within the social network.

According to one embodiment of the present invention, a computer system propagates software over a social network through an instant message client. The software is propagated to a computing device in the social network over the instant message client, wherein the software is based upon a rating system within the social network.

According to one embodiment of the present invention, a computer program product propagates software over a social network through an instant message client. A computer readable storage medium has computer readable program code embodied therewith, the computer readable program code comprises code configured to propagate the software to a computing device in the social network over the instant message client, wherein the software is based upon a rating system within the social network.

DETAILED DESCRIPTION

Figure 1:
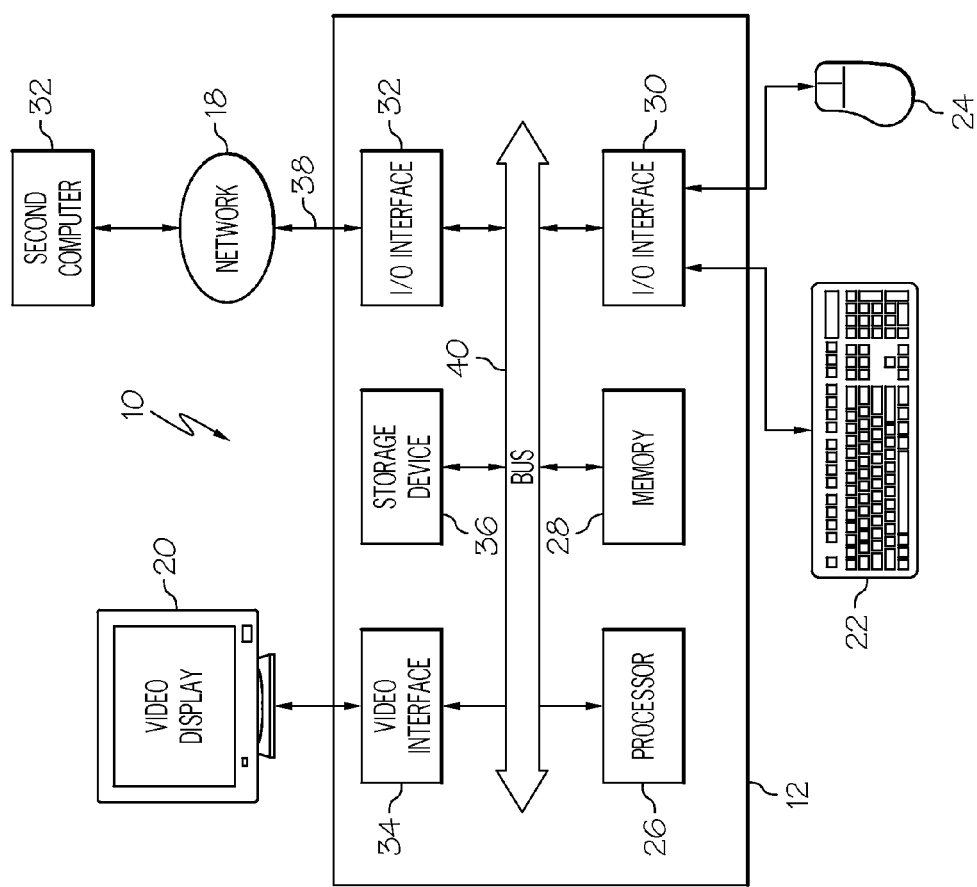
FIG. 1 illustrates a hardware system that implements an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create implementations of the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is an illustration of a computer system 10 suitable for executing computer software for propagation of software features through networks in accordance with the techniques described. Other processing devices which may be suitable for executing the software can be a wireless telephone, personal assistant device (PDA), portable computer, smart remote control device, or any other processing devices that can execute such software.

The computer system 10 is of a type that executes under a suitable operating system installed on the computer system 10, and may be thought of as comprising software code for efficiently controlling propagation of software features in a peer-to-peer messaging system. The components of the computer system 10 include a first computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 are connected to an internal bus 40 that includes data, address, and control buses, to allow components of the computer 12 to communicate with each other via the bus 40. The first computer 12 can be connected to one or more other similar computers, such as, second computer 14, via an input/output (I/O) interface 32 using a communication channel 38 to a network 18.

The computer software may be recorded on a computer readable storage medium, in which case, the computer software program is accessed by the first computer system 10 from the storage device 36. Alternatively, the computer software can be accessed directly from the network 18 by the computer 12. In either case, a user can interact with the computer 12 using the keyboard 22 and mouse 24 to operate the programmed computer software executing on the computer 12.

In an embodiment of the present invention, use may be made of the familiarity and trust between users in a social network. Filtering and recommendation mechanisms (hereinafter, propagation) for distribution of new application components as well as component upgrades (collectively referred to hereinafter as plug-ins) can be based on the affinity between users within their social network. Thus, specific plug-ins can be targeted to specific users during IM sessions between users who share common needs.

In an embodiment of the present invention, authors (of features/updates) and users have a mechanism to recommend and directly provide features/updates to colleagues in their extended social network communities. Such a mechanism for recommendation comes into play when User A starts an IM conversation with another User B. User A may have a feature that he finds very useful and may recommend it to his colleagues at work. When User A starts an IM session with his colleague, User B, the system will be able to automatically recommend the feature to User B and transmit the feature to User B's system to be later installed by User B.

Figure 2:
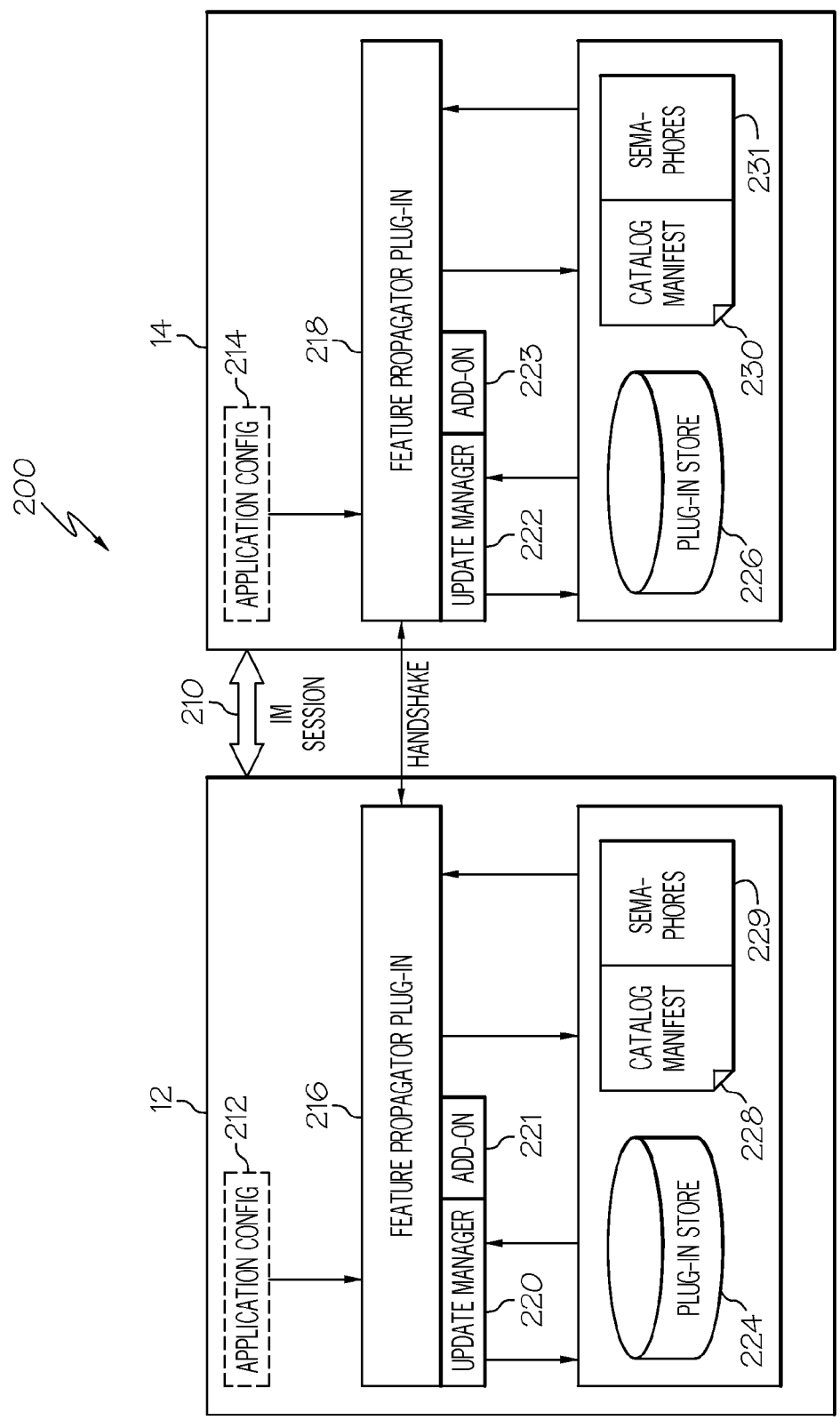
FIG. 2 illustrates an embodiment of the invention in an instant messaging environment.

Referring now to FIG. 2, a peer-to-peer messaging system 200 which may implement an embodiment of the present invention is illustrated. The first computer 12 is interconnected to the second computer 14 through a network 18 (FIG. 1). The users of the first computer 12 and the second computer 14 may engage in an instant messaging (IM) session 210 using an IM service in a social network. The session 210 could be, for example, within a corporate environment with services such as IBM® Lotus® Sametime®, a public environment with web delivered IM services to a web browser, or a public environment with Web delivered IM to a rich client such as IBM Lotus Sametime (IBM, Lotus, and Sametime are trademarks of IBM Corp. in the United States, other counties, or both). The IM service provides authentication, and also provides a channel for information/data to be transferred between the two users. An embodiment of the invention exists in an IM client environment on each user's system. For example, it could be a set of Eclipse plug-ins in an IBM Lotus Sametime Client or browser plug-ins in a web browser client such as Firefox.

Computers 12 and 14 have an application config (hereinafter, config) 212 and 214, respectively, which provides information regarding the features/tools and updates installed in the host application (IBM Lotus Sametime, Browser, etc.) of the user's system. The configs 212 and 214 also contain information about the operating environment that is required for compatibility. While the configs 212 and 214 may be similar, there are likely to be differences due to personal preference, specific project needs and changes that have or have not been made by the user.

Computers 12 and 14 include a Feature Propagator Plug-in (hereinafter, propagator) 216 and 218, an Update Manager (hereinafter, manager) 220 and 222, an Update Manager Add-on (hereinafter, add-on) 221 and 223, a Plug-in Store (hereinafter, store) 224 and 226, Catalog Manifest Tables (hereinafter, manifest) 228 and 230 and Semaphore Tables (herein after, semaphore) 229 and 231, respectively. As used herein, plug-ins are structured bundles of code and/or data that contribute function to a computer system. Plug-ins provide 'plug-and-play' components in pluggable architecture based systems (such as, Eclipse based systems and browsers). This makes components easy to distribute and install. Each plug-in component has a name, identifier, description of what it does, its version, information about who authored it, etc.

The stores 224 and 226 are local repositories on the user's computer which store all the features/updates received by the user either during IM sessions with other users or by way of download from a centrally hosted server site. The stores 224 and 226 allow the managers 220 and 222 access to the stored features/updates and apply them to the users' computer when required by the user. The stores 224 and 226 also allow the propagators 216 and 218 access to the stored features/updates and to send them to other users, as will be subsequently described in greater detail.

The manifests 228 and 230 are catalogs of features/updates available in the stores 224 and 226 and could be, for example, XML files that are machine readable. When a feature/update is added to the stores 224 and/or 226, the respective manifest 228 or 230 is updated to reflect the details of the new feature/update. Thus, it is possible to identify features/updates that are available to be applied to the user's computer. The manifests 228 and 230 are also used to identify what features/updates are available to be propagated to other users.

The propagators 216 and 218 are responsible for establishing a connection between two users over the IM channel. For example, when a User A (on computer 12) starts an IM session 210 with a User B (on computer 14), the propagator 216 or 218 on each user's computer will determine whether the other user has a compatible system to propagate features/updates. The propagators 216 and 218 also check whether User A and/or User B wants to allow an exchange of features/updates.

The propagators 216 and 218 will then allow an exchange of information between the two users on available features/updates. The information to be exchanged is gathered by propagators 216 and 218 by examining the configs 212 and 214 (this tells what is installed) and the manifests 228 and 230 (this tells what is available to install and transfer) of both computers to determine if there are features/updates that can be exchanged. Features/updates may include, for example, features/updates available on User A's computer 12 but not on User B's computer 14 and features/updates for which computer 12 has a newer version compared to what is on computer 14. Based on what features/updates are available on User B's computer 14, the propagator 216 on User A's computer 12 can determine what features/updates can be sent from User A's computer 12 to User B's computer 14. The propagator 216 can then package and transmit such features/updates to User B's computer 14. The propagator 218 on User B's computer 14 will receive such features/updates from User A's computer 12 and save them in the store 226 on User B's computer 14 and update the manifest 230 on User B's computer 14. In this way, the propagation of features/updates flows from computer 12 to computer 14. Similarly, new features/updates can propagate from computer 14 to computer 12.

The managers 220 and 222 allow the computers 12 and 14 to connect to a particular server, access any updates/features available on that server and apply them to the User's computer. The add-ons 221 and 223 allow the computers 12 and 14 to connect to a particular server, access features/updates from the server and save them to a local store on the User's computer (Plug-in Store 224 or 226). The add-ons 221 and 223 do the additional task of saving features/updates downloaded by the managers 220 and 222 to the stores 224 and 226 in order to make them available to other users. The add-ons 221 and 223 also do the additional task of accessing features/updates from the stores 224 and 226 and providing them to the managers 220 and 222 to install (deferred install).

The semaphores 229 and 231 are used by their respective propagator 216 or 218 to determine if a given feature/update is currently being propagated to the User's computer, and, if so, not allow another user to send the same feature. To achieve this, the propagators 216 and 218 set a flag in semaphores 229 and/or 231 when it starts receiving a specific feature.

For example, User A is chatting with two other users, User B and User C. User B and User C have a feature called Feature 1, while User A does not. In this case, when the chat session between User A and User B starts, the system will begin sending Feature 1 from User B's machine to User A's machine. When User A also starts to chat with User C, User C's computer will also attempt to send Feature 1 to User A, but since it is already being sent by User B, User A's system will not accept Feature 1 from User C. The flags set in the appropriate semaphores make this determination possible.

Figure 3:
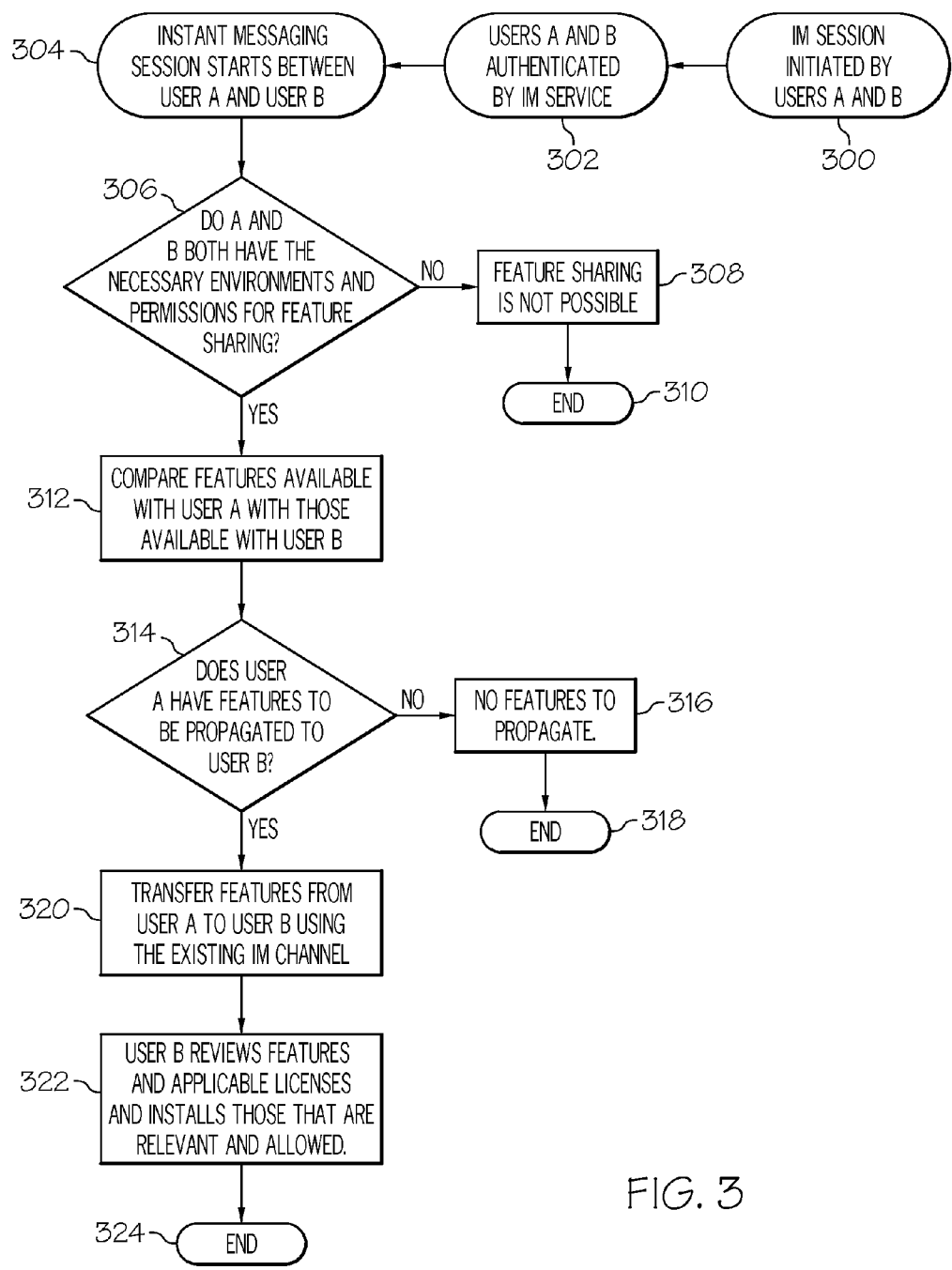
FIG. 3 illustrates a flow chart of an embodiment of the present invention.

With reference to FIG. 2 and FIG. 3, an embodiment of the present invention is described as an example between two users (User A and User B). The example described is from the perspective of User A, however, similar actions would be performed as described herein and shown in FIG. 3 for a transfer from B to A. The Users A and B commence the IM session 210 at block 300 with each using the IM service in their social network. As previously stated above, this could be within a corporate environment with services such as IBM Lotus Sametime or in a public environment with web delivered IM services to a browser or rich client. The IM service authenticates the IM users at block 302 and provides a channel for information/data to be transferred between the two users.

At block 304, the IM session 210 starts between User A and User B. In decision block 306, the system (i.e., the computing environment of the user including the operating system, the application, and the Feature propagator) checks for software compatibility between the two user client environments. The computing environments need to be compatible for feature propagation to work. They need not be identical but do need some level of compatibility for the feature that is to be propagated to work. For example: If User A running Microsoft® Windows® (Microsoft and Windows are trademarks of Microsoft Corp. in the United States, other countries or both) sends a plug-in feature to User B running Linux® (Linux is a trademark of Linus Torvalds in the United States, other countries or both), the feature may work if that plug-in is operating system independent. This check is to determine both whether feature sharing is possible and whether the users want to share. For example, if User A has a feature that User B does not have, User B can still prevent receipt of the feature. Likewise, User B may not want to share a feature with User A.

If the response to decision block 306 is no, feature sharing is indicated to be not possible (or one or both users do not want to share) at block 308 and the process ends at 310. However, if the response to decision block 306 is yes (sharing is possible and both users want to share features), the process continues to block 312. At block 312, the features available on user A's computer are compared with the features on User B's computer by the process previously described above.

It is then determined at decision block 314 whether User A has features to be propagated to User B as a result of the comparison conducted in block 312. If the response to decision block 314 is no, there are no features to propagate at block 316 and the process end s at 318.

However, if the response to decision block 314 is yes, the process proceeds to block 320. At block 320, the features to be propagated are transferred from User A to User B using the existing IM session connection. At block 322, User B's system will let User B know that there are new features available to install. This can be via user interface prompts or via addition to a catalog of available updates and components in User B's environment. User B will then be able to review each new feature and choose to install based on relevance, security and licensing considerations.

Thus, an embodiment of the present invention may be based on User B's relationship with User A, as well as other aspects such as shared interests, common communities, roles etc. To achieve this, a table may be created to store information such as a numeric rating for each plug-in (for example, a 1/2/3 system where, 1 is very highly recommended, 2 is good to have, and 3 may help some). When User B receives the plug-in from User A and installs it, the default would be set to the value received from User A. Thereafter, based on User B's experience with the feature/update, the system can automatically increase or decrease the rating using parameters such as number of times used, time spent per usage and other such relevant information. In addition, the system can also provide an interface for the user to directly set the rating for the given plug-in. This rating system may allow highly rated plug-ins to be given a priority for transmittal during IM sessions, thus, making it possible for users in a social network to influence each other's experience during casual IM conversations by sharing the features/updates they have and that they recommend for others.

A user can be a member of many communities of professional and/or personal interest. Such information can be derived from the user's social networks within and/or outside organizational boundaries. For example: A user may subscribe to a Product Management community within an organization, to a Wildlife Photographer community on a social networking site, and so on. It may be possible to construct software to automatically discover a user's communities and make them available to the system to determine which features/updates would be of interest. Such information would be stored in the Application Config (config 212/214) section of the system.

An embodiment of the system provides a mechanism for the user to indicate communities of interest in the plug-in manifest by keying in community names/attributes. When User A initiates an IM session with User B, the system determines User B's communities from the Application Config thereof. If none are specified, User B can be treated as if he has no specific communities, and hence, would be interested in all recommended updates. If there are communities specified in User B's Application Config, the system will attempt to look up features/updates available with User A which are for those specific communities and attempt to transfer them to User B, if User B does not already have them. The very fact that User A is having an IM conversation with User B may indicate that there is some social relationship and affinity between the two users and hence features/updates recommended by User A may be of interest to User B.

An embodiment of the present invention may also provide a mechanism for users to gain a positive reputation in their social networks, i.e., authors of plug-ins that gain widespread usage would gain reputation. Also users who most actively share useful plug-ins would gain relevant reputation. This can be achieved, for example, via a centralized computer system which is capable of receiving computer generated coded messages when a user transfers a plug-in. The message could contain information such as:

1. Author and name of plug-in.
2. Name of user who transmitted the plug-in.
3. Name of a user who received the plug-in.
4. A rating given by a user of the plug-in.

The plug-in propagator of the proposed system could send a computer generated and coded message to a pre-identified central system containing the above information. Such a message can be sent either when the plug-in is transferred during an IM session or when the recipient actually installs the transferred plug-in. The choice is up to the implementation of the system and whether the implementation gives preference to transmittal of the plug-in or the actual installation of the plug-in.

The pre-identified central system collates the information and uses it to create and update information such as:

1. Overall Value of the Plug-in based on a number of transfers/installs and overall rating.
2. 'Author Reputation' of an individual based on the plug-ins authored by that individual and the ratings received by the various plug-ins
3. 'User Reputation' of an individual based on the number of plug-ins transmitted and a total number of times transmitted.

Such information can be fed into a 'Profile' of individuals so that their reputation can be seen by the rest of the community if desired. Thus, the system creates a mechanism for users within a social network to earn repute by authoring and propagating useful features/updates.

As shown in Table 1 below, a possible plug-in manifest of information on a user's system is illustrated:

TABLE 1

Sample Plug-in Manifest information on System of a User nanda@xyz.com

| Plug-in Name and Version information | Plug-in Author | Rating/ Recommendation | Community Affinity |
|---|---|---|---|
| DirLookup, 1.0.1 | nanda@xyz.org | 1 | All |
| DesktopShare, 2.0.0 | iaj@abc.org | 1 | Developers, Testers |
| SharedSpreadSheet, 1.1 | mij@xyz.org | 2 | All, Financial Analysts, Management |

Plug-in Name and Version information: Unique name and version information for the plug-in.
Plug-in Author: Unique name of the author of the plug-in. This could be an email id, for example.
Rating/Recommendation:
1 = very highly recommended,
2 = good to have,
3 = may help some.
Community Affinity: This is a list of social groups whose members will most benefit from this particular plug-in.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of propagating software over a social network through an instant message client from a sending user to a receiving user, comprising:
    initiating an instant messaging session between the sending user and the receiving user;
    determining, with a first processor at a first client of the sending user and a second processor at a second client of the receiving user, if a first operating environment of said first client is compatible with a second operating environment of said second client;
    in response to a determination that said first operating environment is compatible with said second operating environment, comparing at least a first feature on a first manifest of features stored on a first memory of said first client with a second manifest of features stored on a second memory of said second client;
    in response to a determination that said at least a first feature on said first instant message client is different from or not available on said second manifest of features, determining a first reputation score of an author of said at least a first feature, said first reputation score being based upon first predetermined factors; and
    approving propagation of said at least a first feature to said at least a second client when said first reputation score is greater than or equal to a first predetermined value.

2. The method of propagating software of claim 1, wherein said in response to a determination that said at least a first feature on said first instant message client is different from or not available on said second manifest of features, further comprises determining a second reputation score of said sending user, said second reputation score being based upon second predetermined factors.

3. The method of propagating software of claim 2, further comprising approving propagation of said at least a first feature to said second client when said second reputation score is greater than or equal to a second predetermined value.

4. The method of claim 1, further comprising storing a rating system for said at least a first feature within the social network.

5. The method of claim 4, wherein said rating system further comprises an indication of applicability of said at least a first feature to social and non-social communities.

6. The method of claim 4, wherein said rating system further comprises a score of said at least a first feature based on third predetermined factors applicable to said at least a first feature.

7. The method of claim 6, wherein said rating system further comprises adjusting said score after use of said at least a first feature within the social network.

8. A system for propagating software over a social network through an instant message client from a sending user to a receiving user, comprising:
    a processor; and
    memory connected to the processor, wherein the memory is encoded with instructions and wherein the instructions when executed comprise:
    instructions for initiating an instant messaging session between the sending user and the receiving user;
    instructions for determining, at a first client of the sending user and at a second client of the receiving user, if a first operating environment of said first client is compatible with a second operating environment of said second client;
    in response to a determination that said first operating environment is compatible with said second operating environment, instructions for comparing at least a first feature on a first manifest of features stored on said first client with a second manifest of features stored on said second client;
    in response to a determination that said at least a first feature on said first instant message client is different from or not available on said second manifest of features, instructions for determining a first reputation score of an author of said at least a first feature, said first reputation score being based upon first predetermined factors; and
    instructions for approving propagation of said at least a first feature to said second client when said first reputation score is greater than or equal to a first predetermined value.

9. The system of claim 8, wherein said in response to a determination that said at least a first feature on said first client is different from or not available on said second manifest of features, further comprises instructions for determining a second reputation score of said sending user, said second reputation score being based upon second predetermined factors.

10. The system of claim 9, further comprising instructions for approving propagation of said at least a first feature to said second client when said second reputation score is greater than or equal to a second predetermined value.

11. The system of claim 6, further comprising instructions for storing a rating system for said at least a first feature within the social network.

12. The system of claim 11, wherein said rating system further comprises instructions for indicating applicability of said at least a first feature to social and non-social communities.

13. The system of claim 11, wherein said rating system further comprises instructions for scoring said at least a first feature based on third predetermined factors applicable to said at least a first feature.

14. The system of claim 13, wherein said rating system further comprises instructions for adjusting said score after use of said at least a first feature within the social network.

15. A computer program product for propagating software over a social network through an instant message client from a sending user to a receiving user, the computer program product comprising a computer readable storage medium having computer readable program code embodied therewith, the computer readable program code comprising:
    computer readable program code configured to initiate an instant messaging session between the sending user and the receiving user;

computer readable program code configured to determine if a first operating environment of said first client is compatible with a second operating environment of said second client;

in response to a determination that said first operating environment is compatible with said second operating environment, computer readable program code configured to compare at least a first feature on a first manifest of features of said first client with a second manifest of features on said second client;

in response to a determination that said at least a first feature on said first instant message client is different from or not available on said second manifest of features, computer readable program code configured to determine a first reputation score of an author of said at least a first feature, said first reputation score being based upon first predetermined factors; and computer readable program code configured to approve propagation of said at least a first feature to said at least a second client when said first reputation score is greater than or equal to a first predetermined value.

16. The computer program product of claim 15, wherein said in response to a determination that said at least a first feature on said first client is different from or not available on said second manifest of features, further comprising computer readable program code configured to determine a second reputation score of said sending user, said second reputation score being based upon second predetermined factors.

17. The computer program product of claim 16, further comprising computer readable program code configured to approve propagation of said at least a first feature to said second client when said second reputation score is greater than or equal to a second predetermined value.

18. The computer program product of claim 15, further comprising computer readable program code configured to store a rating system for said at least a first feature within the social network.

19. The computer program product of claim 18, wherein said rating system further comprises computer readable program code configured to indicate applicability of said at least a first feature to social and non-social communities.

20. The computer program product of claim 18, further comprising computer readable program code configured to score said at least a first feature based on third predetermined factors.

* * * * *